US010428772B2

(12) United States Patent
Spada et al.

(10) Patent No.: US 10,428,772 B2
(45) Date of Patent: Oct. 1, 2019

(54) CANISTER FOR A FUEL TANK OF A VEHICLE

(71) Applicant: FCA Italy S.p.A., Turin (IT)

(72) Inventors: Luigi Spada, Turin (IT); Giovanni Salvi, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/777,802

(22) PCT Filed: Nov. 21, 2016

(86) PCT No.: PCT/IB2016/056992
§ 371 (c)(1),
(2) Date: May 21, 2018

(87) PCT Pub. No.: WO2017/089940
PCT Pub. Date: Jun. 1, 2017

(65) Prior Publication Data
US 2018/0372029 A1    Dec. 27, 2018

(30) Foreign Application Priority Data

Nov. 23, 2015   (IT) .................. 102015000075515

(51) Int. Cl.
*F02M 25/08*    (2006.01)
*B01D 53/04*    (2006.01)

(52) U.S. Cl.
CPC ..... *F02M 25/0854* (2013.01); *B01D 53/0407* (2013.01); *B01D 2253/102* (2013.01);
(Continued)

(58) Field of Classification Search
CPC ............... F02M 25/08; F02M 25/0854; F02M 2025/0881; B01D 53/0407;
(Continued)

(56) References Cited

U.S. PATENT DOCUMENTS

| 4,381,929 A | 5/1983 | Mizuno et al. |
| 2006/0196480 A1 | 9/2006 | Kosugi et al. |

(Continued)

FOREIGN PATENT DOCUMENTS

| EP | 1113163 A2 | 7/2001 |
| WO | 2015104813 A1 | 7/2015 |

OTHER PUBLICATIONS

PCT International Search Report and Written Opinion dated Mar. 3, 2017 for PCT International Application No. PCT/IB2016/056607, 11 pages.

(Continued)

*Primary Examiner* — Hieu T Vo
(74) *Attorney, Agent, or Firm* — RMCK Law Group PLC

(57) ABSTRACT

A canister for absorption of fuel vapors from a fuel tank, includes a hollow body defining an internal chamber containing absorbent material, a first opening communicating with a tank vent conduit, a second opening vented towards the atmosphere, and a third opening communicating with a conduit connected to an engine intake manifold. The canister body has outer and inner side walls parallel to and spaced apart from each other, and defining therebetween a thermally insulating interspace extending continuously for the whole circumferential extension of the outer side wall, on all sides of the canister body, whereby said thermally insulating interspace surrounds the internal chamber and promotes saving of heat generated inside the internal chamber in the absorption operating mode, during an engine inoperative stage, so as to improve canister scavenging efficiency during a subsequent stage wherein the scavenging operating mode is activated, when the engine is operative.

9 Claims, 7 Drawing Sheets

Figure 1:
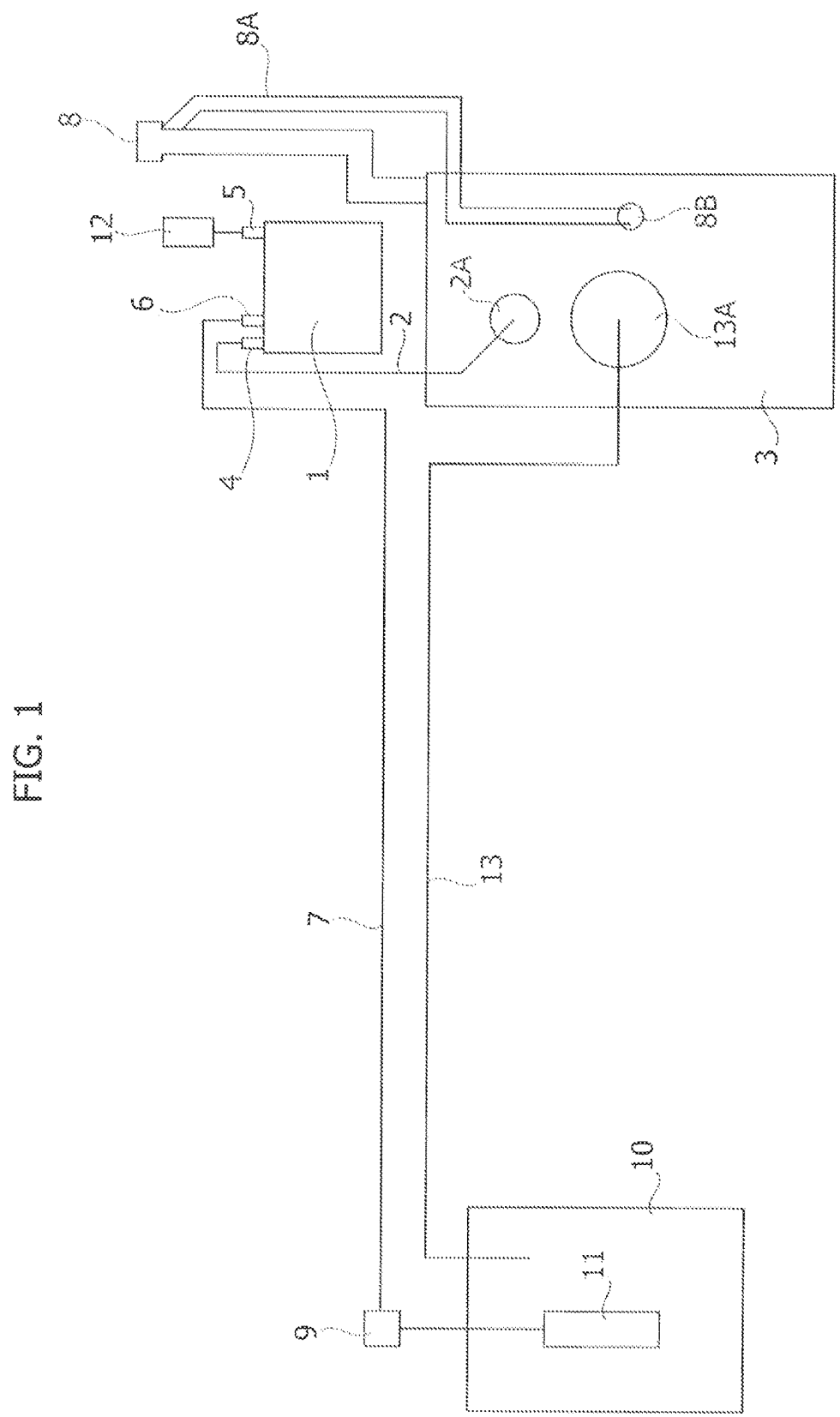

(52) U.S. Cl.
CPC .............. *B01D 2259/40086* (2013.01); *B01D 2259/4516* (2013.01); *F02M 2025/0881* (2013.01)

(58) Field of Classification Search
CPC .... B01D 2253/102; B01D 2259/40086; B01D 2259/4516
See application file for complete search history.

(56) References Cited

U.S. PATENT DOCUMENTS

| | | |
|---|---|---|
| 2008/0251139 A1 | 10/2008 | Wang et al. |
| 2011/0247592 A1 | 10/2011 | Kim et al. |
| 2014/0041522 A1 | 2/2014 | Yoshida et al. |

OTHER PUBLICATIONS

PCT International Search Report and Written Opinion dated Mar. 20, 2017 for PCT International Application No. PCT/IB2016/056992, 11 pages.

CANISTER FOR A FUEL TANK OF A VEHICLE

CROSS-REFERENCE TO RELATED APPLICATIONS

This application is a 371 U.S. National Stage of International Application No. PCT/IB2016/056992, filed Nov. 21, 2016, which claims priority to Italian Application No. 102015000075515 filed on Nov. 23, 2015. The disclosure of each of the above applications is incorporated herein by reference in their entirety.

FIELD OF THE INVENTION

The present invention relates to systems for fuel supply to a motor-vehicle engine, of the type in which a fuel tank is provided with a vent conduit connected to a device named "canister", which is arranged outside the tank, and is provided of a filter (for example with active carbons) for absorption of fuel vapours which are in the tank and in the vent conduit, in order to avoid that these vapours are released into the atmosphere. The canister has a first operative mode, named "absorption", which is actuated when the engine is inoperative, wherein fuel vapours generated within the tank are absorbed by the active carbon filter, and the canister has a second operative mode, named "scavenging", which is actuated when the engine is operative, wherein a flow of fresh air is sucked into the intake manifold of the engine of the motor-vehicle, so that the flow of air passes through the active carbon filter of the canister, thus obtaining scavenging of the active carbon filter.

In particular, the invention relates to a canister of the type comprising a hollow body having at least a top wall, a lower wall and a side wall which connects said top wall to said lower wall on all sides of the body of the canister, so as to define at least one internal chamber, wherein said at least one internal chamber contains absorbent material of fuel vapours, and wherein said hollow body of the canister has a first opening for communication with a vent conduit of the tank, a second opening vented towards the atmosphere, and a third opening for communication with a duct, connected to the intake manifold of the internal combustion engine of the motor-vehicle, in such a way that, when the internal combustion engine is inoperative, any fuel vapour generated within the tank of the motor-vehicle is absorbed by said absorbent material in said at least one internal chamber of the canister, in an absorption operating mode of the canister, while when the internal combustion engine is operative, said canister is in a scavenging operating mode, wherein a flow of air taken from the atmosphere is sucked into the chamber of the canister and conveyed through the absorbent material and into the duct connected to the intake manifold of the internal combustion engine, thus obtaining scavenging of the absorbent material and removal and conveyance into the engine of the fuel particles previously absorbed by the absorbent material.

PRIOR ART

Canister of the type indicated above are for example known from documents WO 2015/104813 A1, U.S. Pat. No. 6,474,312 B1, US 2014/041522 A1, EP 1 113 163 A2, US 2008/251139 A1, U.S. Pat. No. 4,381,929 A, US 2011/247592 A1.

In the past, control systems of fuel vapours of the type indicated above has been proposed, in which is provided a device adapted to heat active carbons provided into the canister considering that scavenging stage of the canister is more effective if the active carbon filter is maintained at high temperature.

A solution of the type indicated above is for example known from document EP 2 740 925 A2 on behalf of Delphi Technologies. In this solution, a system is provided for transferring heat inside the canister in order to maintain the active carbon filter at higher temperature and in order to make more effective scavenging stage of the canister. As a matter of fact, the system described above comprises also a heater cartridge (containing an electric resistor) arranged at least partially into the canister and located in direct contact with the active carbon filter so as to transfer heat. This solution has the drawback of a canister with higher complexity and higher cost, and also an additional energy expenditure for energy supply of the heater.

PURPOSE OF THE INVENTION

The purpose of the present invention is to provide a canister which is adapted to obtain high efficiency of scavenging stage, with simple and low cost means.

SUMMARY OF THE INVENTION

In view to achieve this purpose, the invention has for subject a canister having the features which has been indicated at the beginning of the present description and also characterized in that the body of said canister has an outer side wall and an inner side wall which are parallel to, and spaced apart from each other, and which define therebetween a thermally insulating interspace which extends continuously for the entire circumferential extension of the outer side wall of the canister, on all sides of the canister body, with exception of the upper side and the lower side, whereby said thermally insulating interspace surrounds said at least one internal chamber and promotes saving of heat generated inside said at least one internal chamber in said absorption operating mode, during an inoperative stage of the engine, so as to improve scavenging efficiency during a subsequent stage wherein the scavenging operating mode is activated, when the engine is operative.

In a specific embodiment, the aforementioned interspace defines an empty space, while in a variant the interspace is filled with an insulating material so as to further improve thermal insulation.

Due to the invention it is possible to reduce quantity of absorbent material located into the canister comparing conventional solutions and also to reduce volume of sucked air needed for functioning of the absorbent material.

DETAILED DESCRIPTION OF FURTHER EMBODIMENTS

Figure 2:
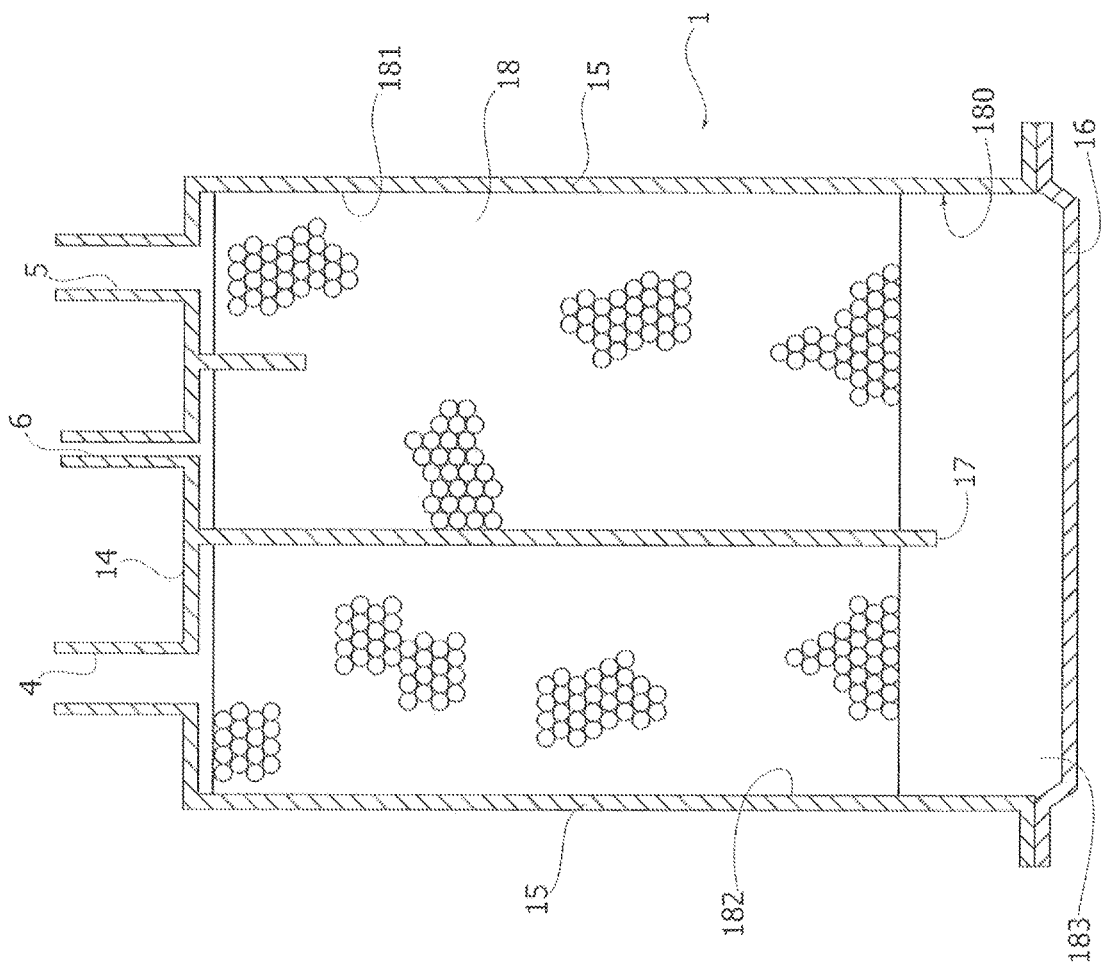
Figure 3:
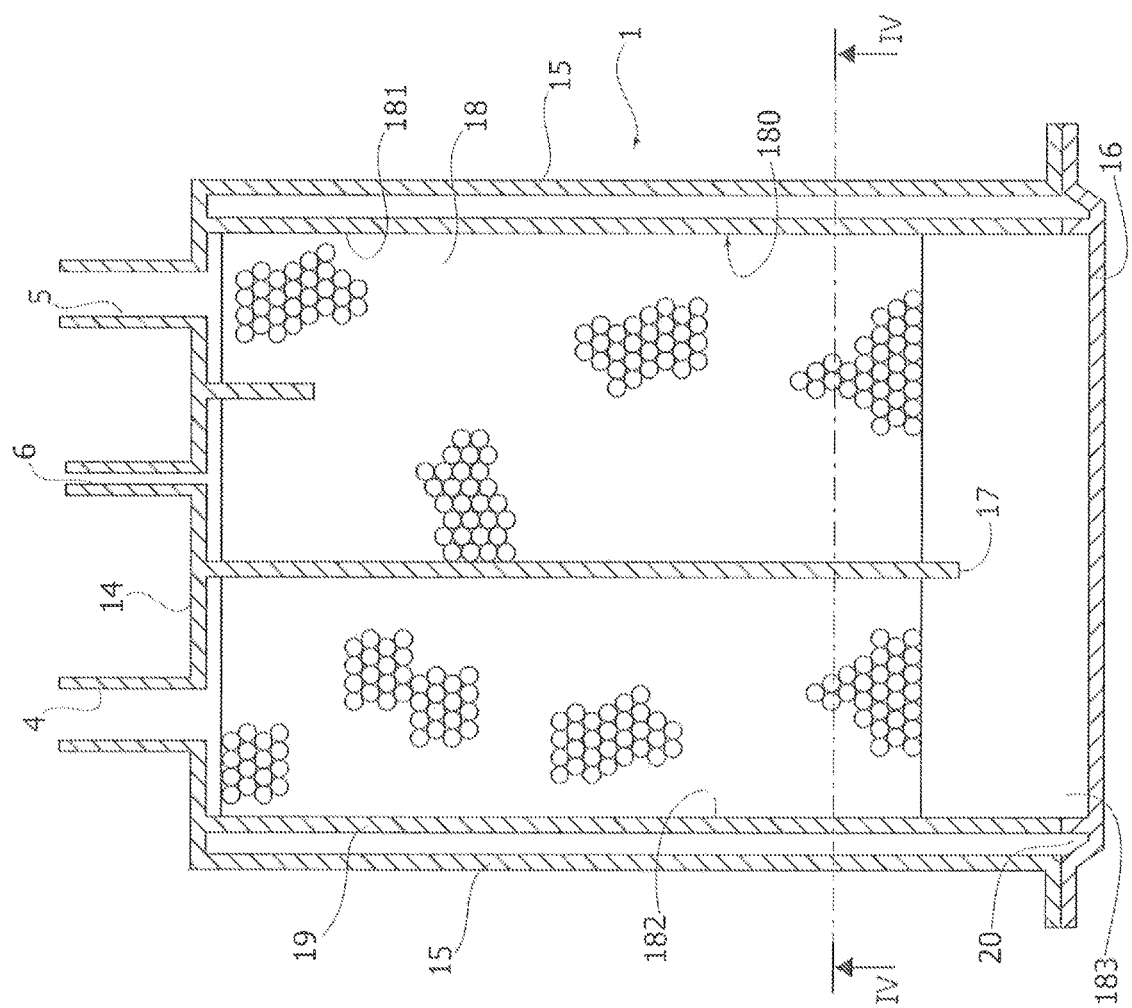
Figure 4:
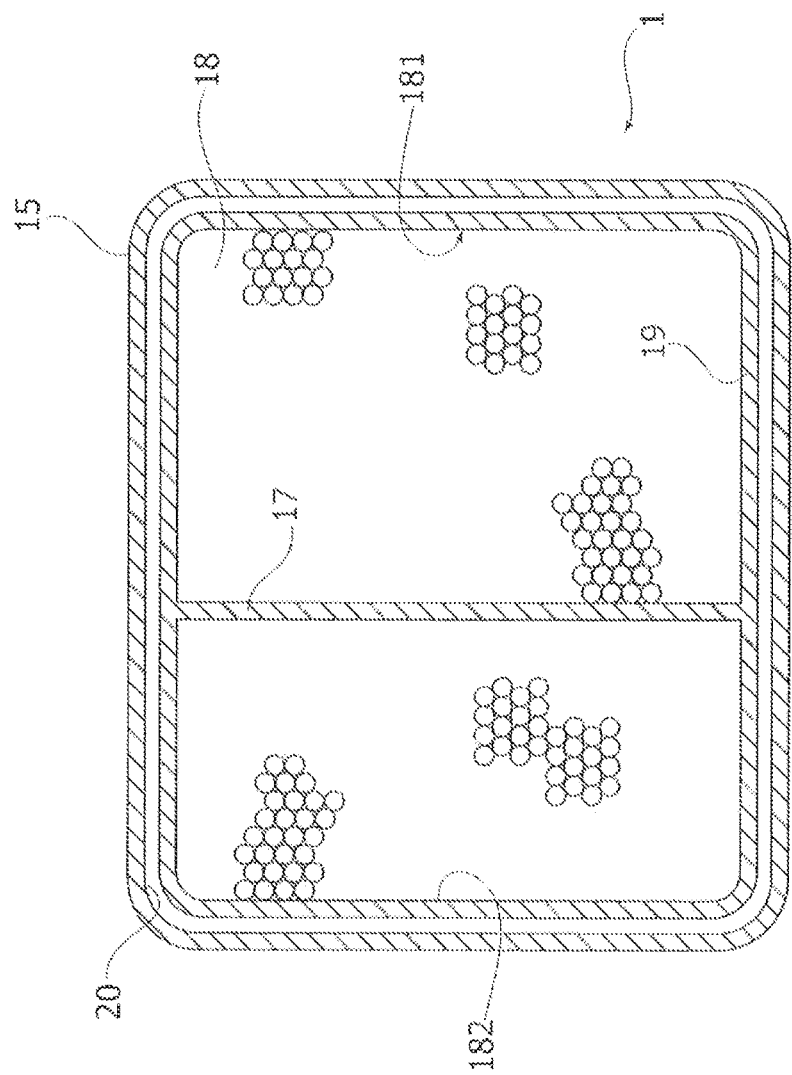

Further features and advantages of the invention will become apparent from the following description with reference to the annexed features, given purely by way of non limiting example, in which:

FIG. 1 is a diagrammatic view which shows a fuel supply system for a motor-vehicle engine, with a canister provided according to prior art, FIG. 2 is a cross-section top view of a canister according to prior art, FIG. 3 is a cross-section top view of a canister according to a preferred embodiment of the invention, FIG. 4 is a cross-section view according line IV-IV of FIG. 3, FIGS. 5-7 are variants of FIG. 3 which show alternative embodiments of the invention.

FIG. 1 shows a diagrammatic view of a fuel supply system for a motor-vehicle engine comprising a canister 1. With reference also to FIG. 2 which shows a canister according prior art, the canister 1 has a hollow body containing a certain quantity of absorbent material 18 for absorption of fuel vapours from a fuel tank 3. The canister 1 has a first opening 4 constituting a vent port of the tank, wherein said first opening 4 is located in communication with the tank 3 by means of a vent conduit 2. Furthermore, the canister 1 has a second opening 5 vented towards the atmosphere by means of a passage in which is interposed an air filter 12 provided with expanded plastic material or paper and having function of protecting the canister from impurity during scavenging stages of the canister (as described in the following). Furthermore, the canister 1 has a third opening 6 constituting a scavenging port which communicates with a conduit 7 connected to the intake manifold 11 of the internal combustion engine 10 of the motor-vehicle. The communication between the canister 1 and the intake manifold 11 is controlled by a valve 9 controlled by an electronic control unit herein not illustrated.

Again according FIG. 1, the fuel tank 3 is in communication with the internal combustion engine 10 by means of a supply line 13 and a fuel pump 13A. According prior art, the line 13 supplies fuel to fuel injectors associated to the engine cylinders. Details relative to the injectors associated to the internal combustion engine receiving fuel by means of the line 13 are not herein illustrated, because they are not part of the scope of the present invention. Furthermore, the elimination of these details from drawings renders the latter simpler and easier to understand.

FIG. 1 shows also a conduit 8 for filling the tank associated with a recirculation conduit 8A which is connected with the tank by means of a valve 8B which allows flowing of liquid fuel and vapours only towards the tank. Again in a known operative mode, the communication of the vent conduit 2 with the tank is controlled by a valve 2a which allows fuel vapours formed in the tank 3 to flow towards the canister 1 to the line 2, while preventing flowing of liquid fuel.

FIG. 2 shows a cross-section top view of a canister according prior art. The body of the canister has a top wall 14 having the openings 4, 5, 6 previously described, a lower wall 16 and a side wall 15 which connects the top wall 14 and the lower wall 16 on all sides of the canister body. Consequently, the canister 1 is constituted by a hollow body which defines a chamber 180 containing a certain quantity of absorbent material 18 of fuel vapours generated by the fuel into the tank. Usually, the absorbent material 18 used is active carbon. Again as illustrated in FIG. 2, inside the canister 1 there is an internal baffle 17 which defines a first and a second sub-chamber 181, 182 both containing absorbent material 18 and intended to be traversed in series by the fuel vapours. The aforementioned details related to the structure of the canister according prior art are important, considering that for these aspects the canister of the invention has same features, as will be illustrated in the following. However, as well as it will be explained below, in the canister according the invention the number of sub-chambers and the way in which they are arranged inside the canister can widely vary to what is illustrated in FIG. 2. In particular, it will be possible to provide a plurality of internal baffles defining a serpentine path of the fuel vapours towards a plurality of sub-chambers arranged in series and containing absorbent material.

As known, functioning of the canister 1 provides a first operating mode, absorption mode, which is actuated during stops of the internal combustion engine of the motor-vehicle. In this condition, fuel vapours generated into the tank 3 pass through the vent conduit 2, enter in the first opening 4, pass through the absorbent material 18 according a U path defined by the baffle 17 and in the end go out from the port 5. As a consequence of this process, only clean air is released from the port 5 towards the atmosphere because fuel vapours are retained into the absorbent material 18. As also known, the canister 1 provides a second operative mode, scavenging mode, which is actuated when the internal combustion engine is operative. In this condition, a flow of fresh air is constrained to pass through the canister 1 and to reach the intake manifold 11 of the engine due to the sucked effect generated by the engine cylinders. This flow of fresh air enters in the canister through the port 5 and is conveyed through the U path inside the canister and through the absorbent material 18 contained therein, up to reach a port 6 from which the flow of fresh air passes in the line 7 and in the intake manifold 11 of the engine. In this way it is obtained a "scavenging" of the absorbent material 18 with removal and conveyance of the fuel particles in the engine previously retained during the absorption stage.

Further according to FIG. 2, inside the canister 1 is defined a third sub-chamber 183 which is void of absorbent material 18. This third sub-chamber is arranged in series between the first and the second sub-chamber 181, 182 containing the absorbent material 18 and the third sub-chamber 183 is formed inside the canister 1 since the absorbent material 18 is backed on a supporting elastic element, herein not illustrated, which is arranged with a distance from the lower wall 16. The supporting elastic element can be constituted of expanded plastic material or felt or grids supported by springs so as to guarantee constant compression of the absorbent material.

An embodiment of the present invention is illustrated in FIGS. 3, 4. In these figures, parts in common to what is illustrated in FIG. 2 are indicated by the same reference numbers.

With reference to FIGS. 3, 4, a fundamental characteristic of the canister 1 according to the invention is that the body of the canister comprises an inner side wall 19 which extends continuously around all sides of the chamber 180, with the three sub-chambers 181, 182, 183, and the inner side wall 19 and the outer side wall 15 are parallel to and spaced apart from each other, so as defining an interspace 20 which extends continuously for the whole circumferential extension of the side wall of the canister body 1, on all sides of the canister body, with the exception of the upper side and the lower side, as clearly understandable in the cross-section top view of FIG. 4, so as to surround the internal chamber 180. The walls 15 and 19 can be constituted by separated elements or can be provided in a single piece. In a variant it is possible to provide an interspace 20 which extends also at least partially on the upper side and/or the lower side of the canister body.

In the case of the solution of FIGS. 3, 4, the interspace 20 defines an empty space between the inner wall 19 and the outer side wall 15 wherein the empty space acts as thermal mass capable of thermally isolating the absorbent material 18 inside the canister 1.

Figure 5:
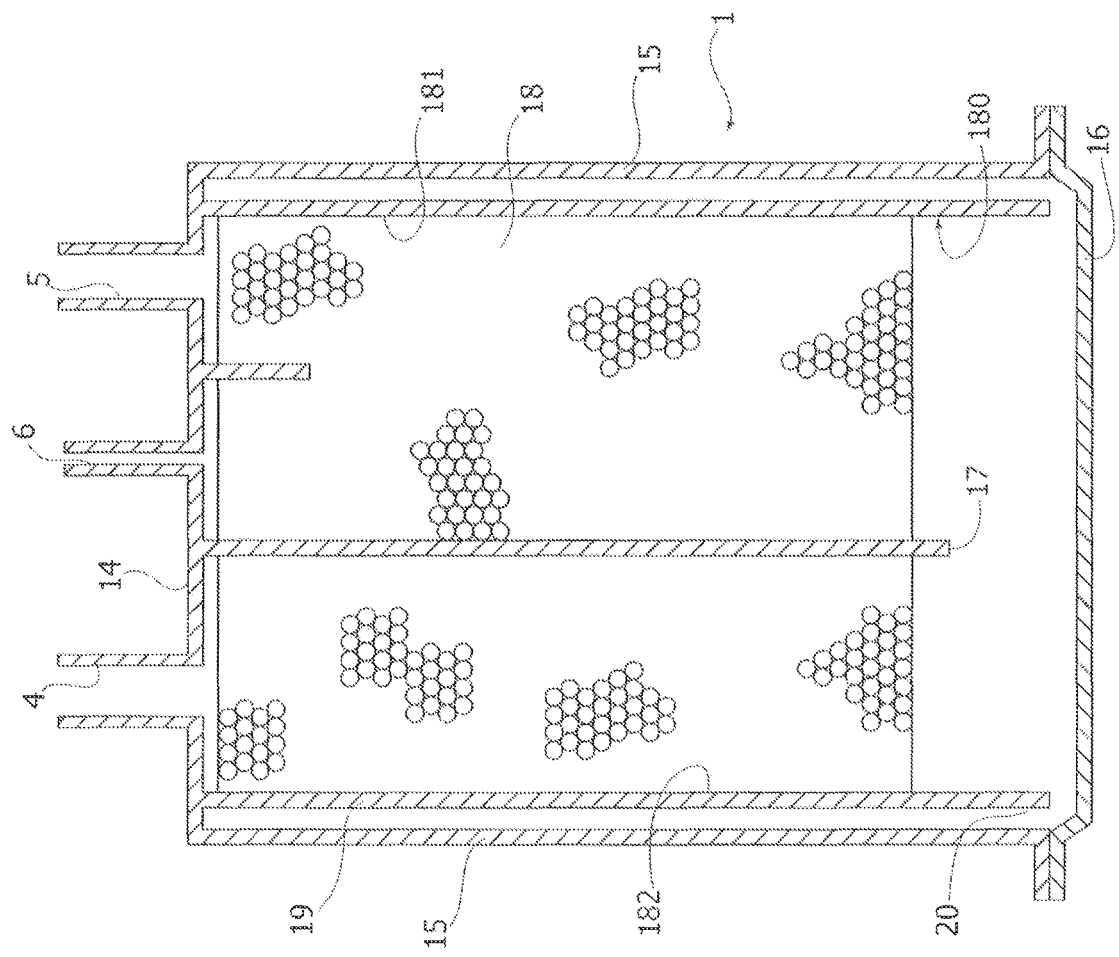

FIG. 5 shows a cross-section view in an alternative embodiment of the invention wherein the inner wall 19 surrounding the chamber 180 let free an opening adjacent to the lower wall 16 of the canister 1, for the whole circumferential extension of the side wall of the canister or for portions thereof. Consequently, in the embodiment herein illustrated, the interspace 20 is in communication with the chamber 180 inside the canister 1.

The embodiment illustrated in FIG. 3 wherein the interspace 20 is not in communication with the chamber 180 is more effective of the embodiment illustrating in FIG. 5, from the point of view of the thermal insulation of the absorbent material 18. The solution shown in FIG. 5 wherein the interspace 20 is in communication with the chamber 180 has the advantage to guarantee a manufacturing process of the canister more simple and economical and has the advantage to create an added volume in communication with the third sub-chamber 183: in this way, emissions of fuel vapours are limited with the motor-vehicle engine inoperative, since the volume that particles of hydrocarbons contained in fuel vapours have to saturate before being released into the atmosphere increases.

Figure 6:
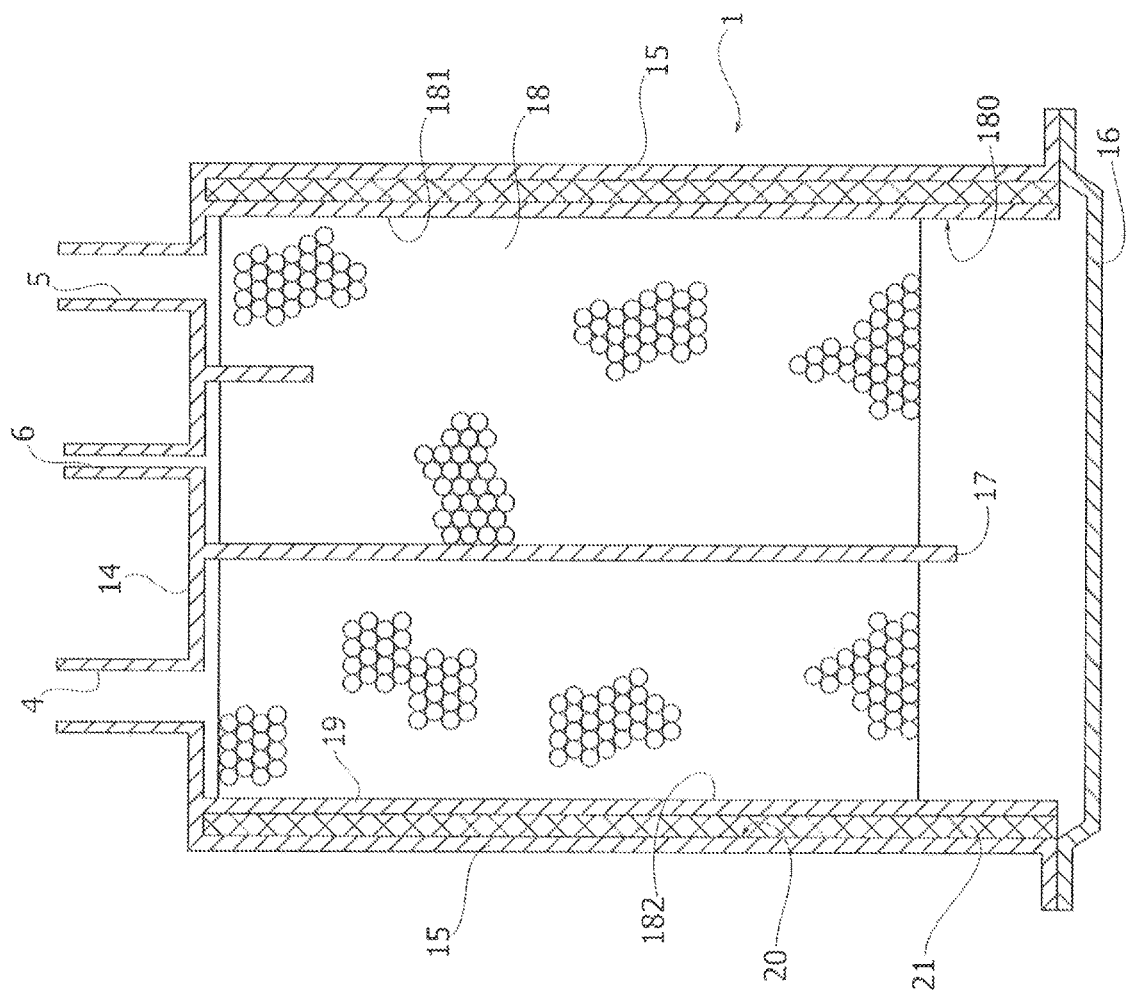
Figure 7:
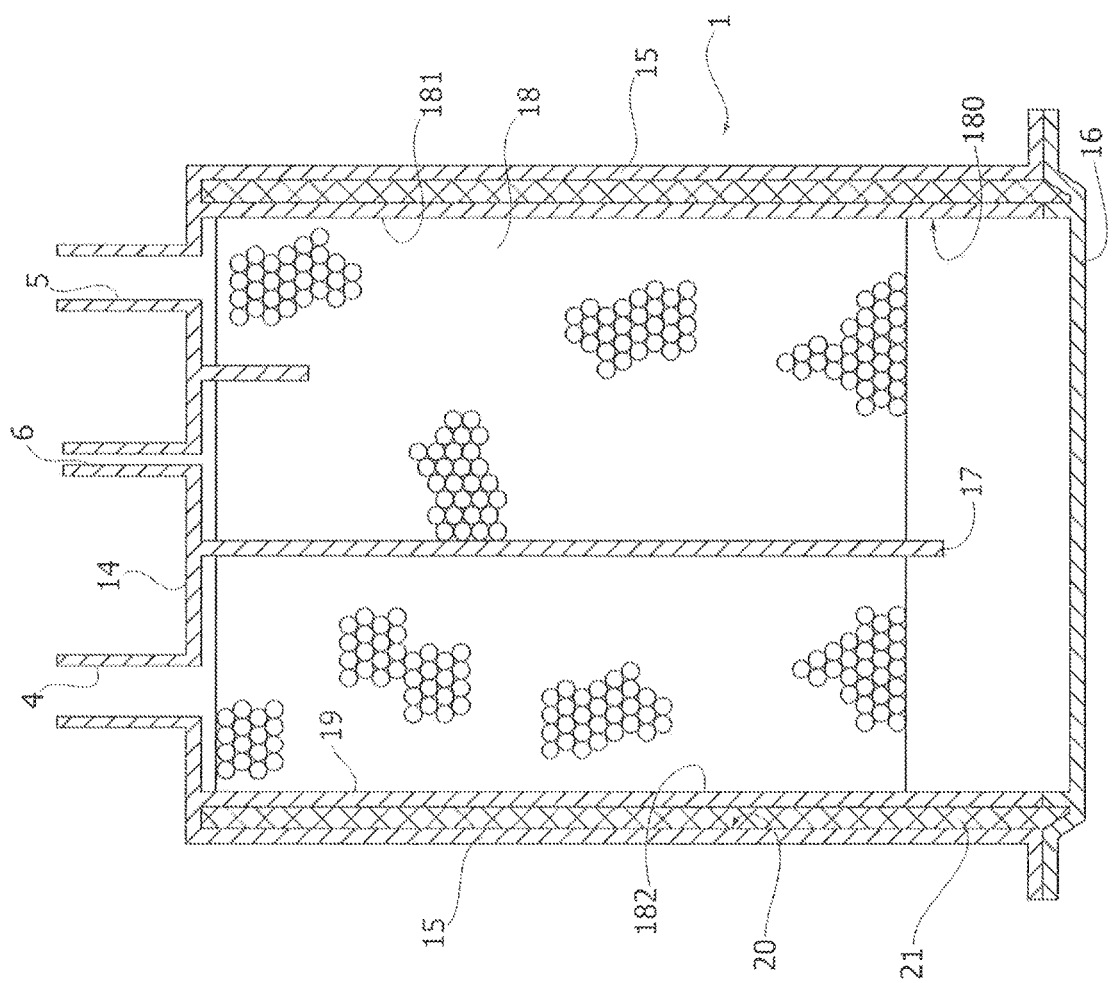

In FIGS. 6, 7 two alternative embodiments of the inventions are shown wherein in both the embodiments the interspace 20 is filled with an insulating material 21, such as expanded plastic material, in order to further improve the insulating effect. In FIG. 6 the inner wall 19 surrounding the chamber 180 let free an opening adjacent to the lower wall 16 of the canister 1 (as in the case of FIG. 5). As in the embodiment of FIG. 3 without insulating material 21, in a further embodiment shown in FIG. 7, the interspace 20 filled with the insulating material 21 is instead completely isolated from the three sub-chambers 181, 182, 183 inside the canister 1.

Due to the interspace 20, the heat produced from the chemical reaction whereby the fuel vapours are absorbed by the canister 1 is retained by the interspace 20. During the scavenging stage previously described, the absorbent material 18 is so maintained with higher temperature and the scavenging stage results particularly effective. This result is achieved without prejudice advantages of a simple and low-cost production of the canister.

Naturally, while the principle of the invention remains the same, the details of construction and the embodiments may widely vary with respect to what has been described and illustrated purely by way of example, without departing from the scope of the present invention.

The invention claimed is:

1. A filtering canister, for absorption of fuel vapours from a fuel tank of a motor-vehicle, comprising:
   said canister including a hollow body having at least a top wall, a lower wall and a side wall which connects said top wall to said lower wall on all sides of the hollow body, so as to define at least one internal chamber,
   wherein said at least one internal chamber containing absorbent material of fuel vapours, and
   said hollow body having a first opening for communication of said at least one internal chamber with a vent conduit of the tank, a second opening vented towards an atmosphere, and a third opening for communication with a duct connected to an intake manifold of an internal combustion engine of the motor-vehicle,
   in such a way that, when the internal combustion engine is in an inoperative stage, any fuel vapour generated within the tank is absorbed by said absorbent material in said at least one internal chamber, in an absorption operating mode of the canister, while when the internal combustion engine is operative, said canister is in a scavenging operating mode, wherein a flow of air taken from the atmosphere is sucked into the at least one chamber of and conveyed through the absorbent material and into the duct connected to the intake manifold, thus obtaining scavenging of the absorbent material and removal and conveyance into the internal combustion engine of fuel particles previously absorbed by the absorbent material,
   wherein the hollow body has an outer side wall and an inner side wall which are parallel to, and spaced apart from each other, and which define therebetween a thermally insulating interspace which extends continuously for the entire circumferential extension of the outer side wall of the canister, on all sides of the hollow body, with exception of an upper side and a lower side, whereby said thermally insulating interspace surrounds said at least one internal chamber and promotes saving of heat generated inside said at least one internal chamber in said absorption operating mode, during said inoperative stage of the engine, so as to improve scavenging efficiency during a subsequent stage wherein the scavenging operating mode is activated, when the internal combustion engine is operative.

2. The canister according to claim 1, wherein said insulating interspace is an empty space.

3. The canister according to claim 2, wherein said insulating interspace is filled with a thermally insulating material.

4. The canister according to claim 3, wherein said inner side wall surrounding the at least one chamber defines a free opening adjacent to the lower wall of the canister, in such a way that said interspace is in communication with said at least one internal chamber inside the canister.

5. The canister according to claim 1, wherein the interspace extends also at least partially on the upper side and/or the lower side of the hollow body.

6. The canister according to claim 5, wherein between said first and second sub-chambers, a third sub-chamber is interposed which does not contain absorbent material.

7. The canister according to claim 1, wherein said at least one internal chamber containing absorbent material has an internal baffle which defines a U-shaped path for the fuel vapours, wherein said internal baffle defines a first and a second sub-chamber containing absorbent material, said first and second sub-chambers being arranged in series to each other.

8. The canister according to claim 1, wherein said at least one internal chamber containing absorbent material has a plurality of internal baffles defining a serpentine path for fuel vapours, through a plurality of sub-chambers arranged in series to each other and containing absorbent material.

9. A system for fuel supply to a motor-vehicle engine, wherein said system comprises a filtering canister according to claim 1.

* * * * *